United States Patent
Yamamoto et al.

(10) Patent No.: US 9,477,137 B2
(45) Date of Patent: Oct. 25, 2016

(54) BLADE DRIVE DEVICE AND OPTICAL APPARATUS

(71) Applicant: SEIKO Precision Inc., Matsudo-shi, Chiba (JP)

(72) Inventors: Masami Yamamoto, Matsudo (JP); Koichi Masuzawa, Matsudo (JP)

(73) Assignee: SEIKO PRECISION INC., Chiba (JP)

( * ) Notice: Subject to any disclaimer, the term of this patent is extended or adjusted under 35 U.S.C. 154(b) by 0 days.

(21) Appl. No.: 15/050,927

(22) Filed: Feb. 23, 2016

(65) Prior Publication Data

US 2016/0274441 A1    Sep. 22, 2016

(30) Foreign Application Priority Data

Mar. 19, 2015 (JP) ................................. 2015-056088

(51) Int. Cl.
*G03B 9/00* (2006.01)
*G03B 13/34* (2006.01)
*G03B 9/18* (2006.01)

(52) U.S. Cl.
CPC . *G03B 9/18* (2013.01); *G03B 9/00* (2013.01); *G03B 13/34* (2013.01)

(58) Field of Classification Search
CPC ............ G03B 9/00; G03B 9/02; G03B 9/14; G03B 9/18; G03B 13/34; G03B 13/36
See application file for complete search history.

(56) References Cited

U.S. PATENT DOCUMENTS

| | | | |
|---|---|---|---|
| 2006/0029385 A1* | 2/2006 | Huang | G03B 9/08 396/452 |
| 2007/0201866 A1* | 8/2007 | Kihara | G03B 9/18 396/468 |
| 2009/0262232 A1* | 10/2009 | Kim | G02B 7/102 348/340 |
| 2009/0295983 A1* | 12/2009 | Sekimoto | H04N 5/2254 348/362 |
| 2011/0134303 A1* | 6/2011 | Jung | H01L 27/14618 348/340 |
| 2015/0229843 A1* | 8/2015 | Shimizu | G03B 5/00 348/222.1 |

FOREIGN PATENT DOCUMENTS

JP        2008-250156 A        10/2008

* cited by examiner

*Primary Examiner* — W B Perkey
(74) *Attorney, Agent, or Firm* — Brinks Gilson & Lione

(57) ABSTRACT

To provide a blade drive device capable of suppressing operation failures due to the leakage flux. The blade drive device 1 attached to a camera module including a lens and a lens drive device 60 having plural permanent magnets 61 arranged with gaps around an optical axis P of the lens in an annular manner so as to overlap the camera module in an axial direction of the optical axis P, which includes a lower plate 2 having an opening 4 formed around the optical axis P, blades 20 regulating the opening 4 and respective actuators 10A, 10B arranged in the lower plate 2 and driving the blades 20. Each of respective actuators 10A, 10B is arranged in a position corresponding to a gap between a pair of adjacent permanent magnets 61 seen from the axial direction.

6 Claims, 6 Drawing Sheets

ANGLE (DEG)

BLADE DRIVE DEVICE AND OPTICAL APPARATUS

RELATED APPLICATIONS

This application claims priority under 35 U.S.C. §119 to Japanese Patent Application No. 2015-056088 filed on Mar. 19, 2015, the entire content of which is hereby incorporated by reference.

BACKGROUND OF THE INVENTION

1. Field of the Invention

The present invention relates to a blade drive device and an optical apparatus.

2. Description of Related Art

There exists an optical apparatus such as a camera which includes a driving source such as a voice coil motor inside in related art. There is a driving source which generate a driving force by an electromagnetic force. The magnetic flux leaked from the driving source (hereinafter referred to as a "leakage flux") may affect the operation of components inside the optical apparatus. For example, in JP-A-2008-250156 (Patent Document 1), there is disclosed a camera which includes an actuator means, a camera-shake correction optical means and a driving means for driving the camera-shake correction optical means to a prescribed position. The camera described in Patent Document 1 controls the driving means by a control means in accordance with the operation timing of the actuator means. Accordingly, the camera described in Patent Document 1 can eliminate the influence of vibration, magnetic induction and magnetic variation inside the actuator occurring when the actuator is driven, thereby realizing a camera-shake correction function not affected by noise or mechanical vibration.

Incidentally, a blade drive device can be mounted on a camera which is mounted on a cellular phone and so on in recent years for improving imaging performance. The blade drive device includes a lower plate having an opening formed around an optical axis of a lens, and an actuator opening and closing the opening of the lower plate by driving blades. The blade drive device is attached so as to overlap a camera module having the lens and a lens drive device.

However, as the above blade drive device is arranged close to the lens drive device, the operation of the actuator may be affected by the leakage flux leaked from the lens drive device. Specifically, defects such as variation in stop positions when the actuator is not energized and shortage of an energization torque occur in the actuator due to the leakage flux. As these defects of the actuator occurs by a stationary leakage flux, it is difficult to eliminate these defects by the control. Accordingly, operation failures may occur in the blade drive device in the case where it is difficult to drive the blades according to the specification, the case where abnormal exposure is caused and other cases. Therefore, there is room for improvement in the related-art blade drive device in a point that operation failures due to the leakage flux are suppressed.

In view of the above, an object of the present invention is to provide a blade drive device capable of suppressing operation failures due to the leakage flux and an optical apparatus including the blade drive device.

SUMMARY OF THE INVENTION

According to an embodiment of the present invention, there is provided a blade drive device attached to a camera module including a lens and a lens drive device having plural magnets arranged with gaps around an optical axis of the lens in an annular manner so as to overlap the camera module in an axial direction of the optical axis, which includes a lower plate having an opening formed around the optical axis, blades regulating the opening, and actuators arranged in the lower plate and driving the blades, in which the actuators are arranged in positions corresponding to the gaps seen from the axial direction.

In the camera module, the plural magnets included in the lens drive device are arranged around the optical axis of the lens (hereinafter referred to merely as an "optical axis") in the annular manner. The position corresponding to the gap between a pair of adjacent magnets seen from the axial direction of the optical axis is an area where a magnetic flux density is locally small as the magnet is not arranged there.

According to the present invention, the actuator is arranged in the position corresponding to the gap between a pair of adjacent magnets seen from the axial direction of the optical axis, therefore, the actuator can be arranged in the area where the magnetic flux density is small. Therefore, the blade drive device capable of suppressing the operation failures due to the leakage flux can be obtained.

It is preferable that rotors of the actuators are arranged in positions corresponding to the gaps seen from the axial direction in the above blade drive device.

Generally, the rotor of the actuator includes a permanent magnet. Accordingly, a rotational torque is generated in the rotor by a magnetic force when the rotor is arranged in an environment with a large magnetic flux density, therefore, it is difficult for the actuator to accurately drive the rotor.

According to the present invention, the rotor is arranged in the position corresponding to the gap between a pair of adjacent magnets seen from the axial direction of the optical axis, therefore, the rotor can be arranged in the area where the magnetic flux density is small. Accordingly, it is possible to suppress the generation of the rotational torque due to the magnetic force in the rotor by the leakage flux and to suppress the operation failures due to the leakage flux.

It is preferable that shield plates formed of a magnetic material are arranged in at least one of an area between the actuators and the camera module and an area in the opposite side of the camera module with the actuators interposed therebetween in the axial direction of the optical axis in the above blade drive device.

According to the present invention, the shield plate formed of the magnetic material is arranged around the actuator, thereby collecting the magnetic flux around the respective shield plate and reducing the magnetic flux density around the respective shield plate. Accordingly, the actuator can be arranged in the area where the magnetic flux density is small. Therefore, the operation failures due to the leakage flux can be suppressed.

It is preferable that the shield plates are arranged so as to cover the rotors of the actuators seen from the axial direction in the above blade drive device as well as arranged in the area between the actuators and the camera module.

The closer the area to the magnet of the lens drive device is, the larger the magnetic flux density of the leakage flux is, when seen from the actuator. As the shield plates are arranged in the area between the actuators and the camera module in which the magnetic flux density is large according to the present invention, the magnetic flux density in areas where the respective actuators are arranged can be positively reduced. Moreover, as the respective shield plates are arranged so as to cover the entire rotors seen from the axial direction of the optical axis, the magnetic flux passing the areas where the actuators are arranged can be reduced. Accordingly, the blade drive device can positively reduce the magnetic flux density in the areas where the rotors are arranged. Therefore, the operation failures due to the leakage flux can be suppressed.

It is preferable that the shield plates are formed of a soft magnetic material in the above blade drive device.

According to the present invention, the shield plates can be formed of soft magnetic materials such as permalloy having high magnetic permeability, thereby collecting the magnetic flux around the shield plates and reducing the magnetic flux density around the shield plates. Therefore, it is possible to further suppress the operation failures due to the leakage flux.

According to the embodiment of the present invention, there is provided an optical apparatus including the above blade drive device.

According to the present invention, the optical apparatus capable of suppressing the operation failures due to the magnetic flux can be obtained as the above blade drive device is included.

As the actuator is arranged in the position corresponding to the gap between a pair of adjacent magnets seen from the axial direction of the optical axis according to the present invention, the actuator can be arranged in the area where the magnetic flux density is small. Therefore, the blade drive device capable of suppressing the operation failures due to the leakage flux can be obtained.

DETAILED DESCRIPTION OF THE PREFERRED EMBODIMENTS

Hereinafter, an embodiment of the present invention will be explained with reference to the drawings.

Figure 1:
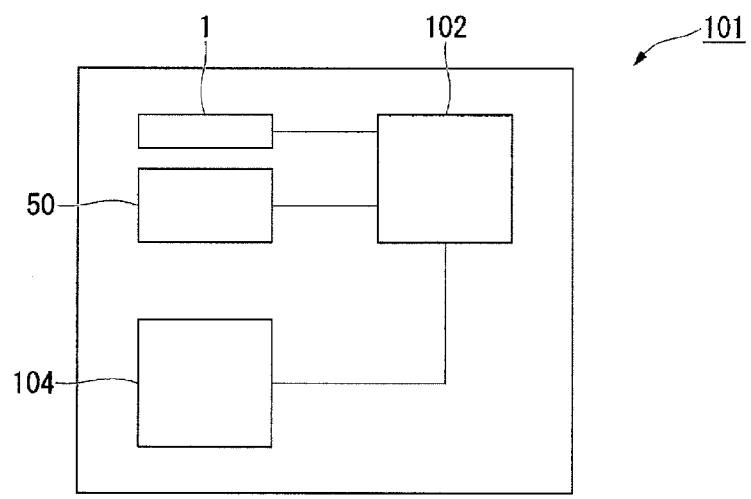
FIG. 1 is a block diagram of an optical apparatus.

FIG. 1 is a block diagram of an optical apparatus.

As shown in FIG. 1, an optical apparatus 101 is a camera to be mounted on, for example, a cellular phone and so on, including a blade drive device 1, a camera module 50, a controller 102 and an imaging device 104.

The controller 102 controls the entire operation of the optical apparatus 101, which includes a CPU (Central Processing Unit), a ROM (Read Only Memory), a RAM (Random Access Memory) and so on. The controller 102 controls the operation of the blade drive device 1 and the camera module 50.

The imaging device 104 is, for example, a CCD (Charge Coupled Device) image sensor, a CMOS (Complementary Metal Oxide Semiconductor) image sensor or the like, which converts an object image formed by light into an electrical signal.

Figure 2:
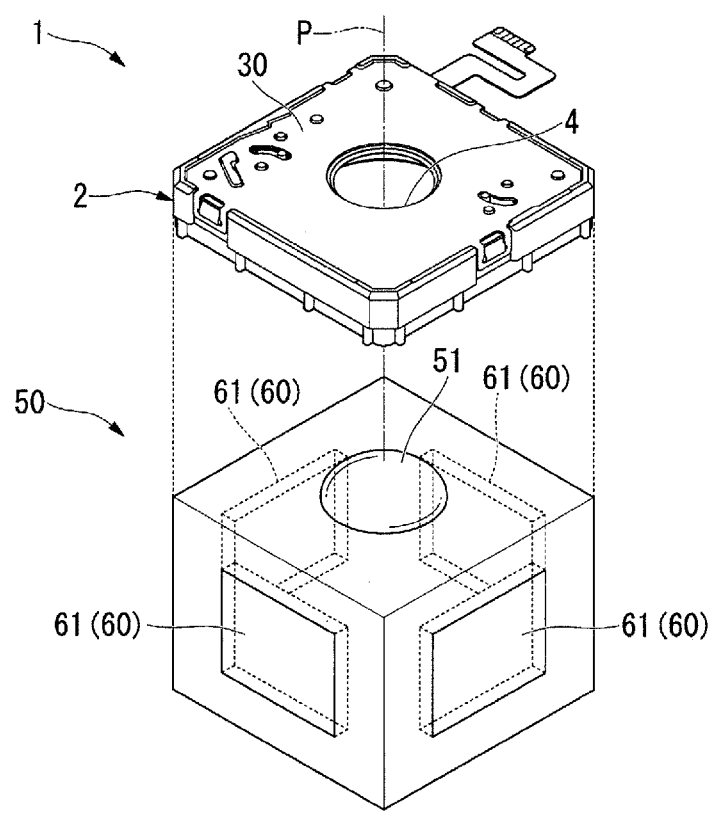
FIG. 2 is a perspective view of a camera module and a blade drive device.

FIG. 2 is a perspective view of the camera module and the blade drive device.

As shown in FIG. 2, the camera module 50 includes a lens 51 for adjusting a focal length and a lens drive device 60 for driving the lens 51. The camera module 50 is formed in a columnar shape having a square cross-section, which extends in an axial direction of an optical axis P (hereinafter referred to merely as "axial direction") of the lens 51.

The lens 51 is arranged in a state exposed to the outside of the camera module 50.

The lens drive device 60 is a voice coil motor including plural (four in the embodiment) permanent magnets 61, a voice coil (not shown) and a yoke (not shown). Respective permanent magnets 61 are formed in a rectangular parallelepiped shape. Respective permanent magnets 61 are respectively arranged on four side surfaces extending along the axial direction of the camera module 50, which are disposed in an annular manner around the optical axis P with gaps. Respective permanent magnets 61 are arranged so that the same magnetic pole faces the optical axis P. In the embodiment, respective permanent magnets 61 are arranged so that N-pole faces the optical axis P. The voice coil is translationally driven along the axial direction. The voice coil supports the lens 51. The lens drive device 60 moves the lens 51 along the axial direction.

The blade drive device 1 is attached so as to overlap the camera module 50 in the axial direction.

Figure 3:
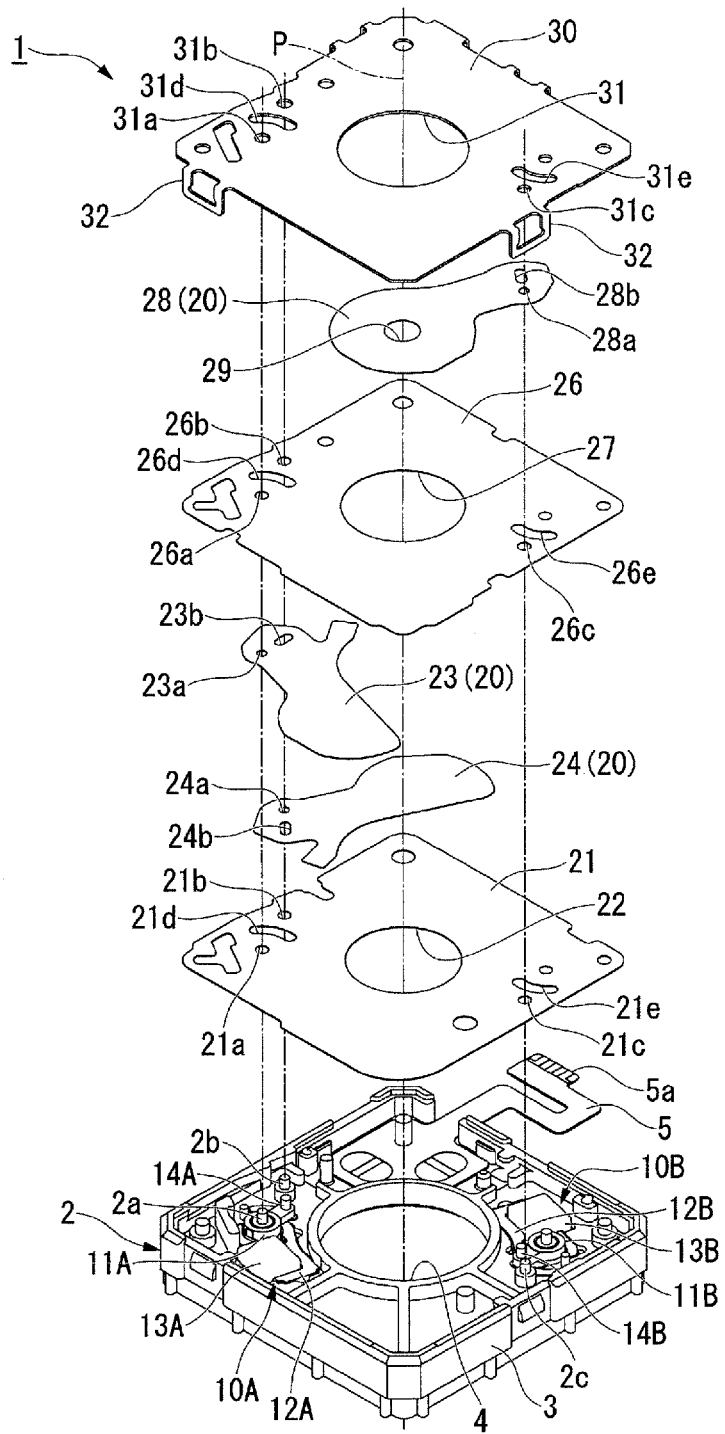
FIG. 3 is an exploded perspective view of the blade drive device.

FIG. 3 is an exploded perspective view of the blade drive device seen from the opposite side of the camera module side.

As shown in FIG. 3, the blade drive device 1 includes a lower plate 2 formed of, for example, a resin material. The lower plate 2 has a thickness in the axial direction and is formed in a rectangular shape which is approximately the same as the camera module 50 (see FIG. 2) seen from the axial direction. A peripheral wall 3 provided to stand toward the opposite side of the camera module 50 is formed in an outer periphery of the lower plate 2. In the center of the lower plate 2, an opening 4 penetrating the lower plate 2 in the axial direction is formed around the optical axis P. The lens 51 which is moved to the outer side from the body of the camera module 50 due to the lens drive device 60 is housed in the opening 4.

Figure 4:
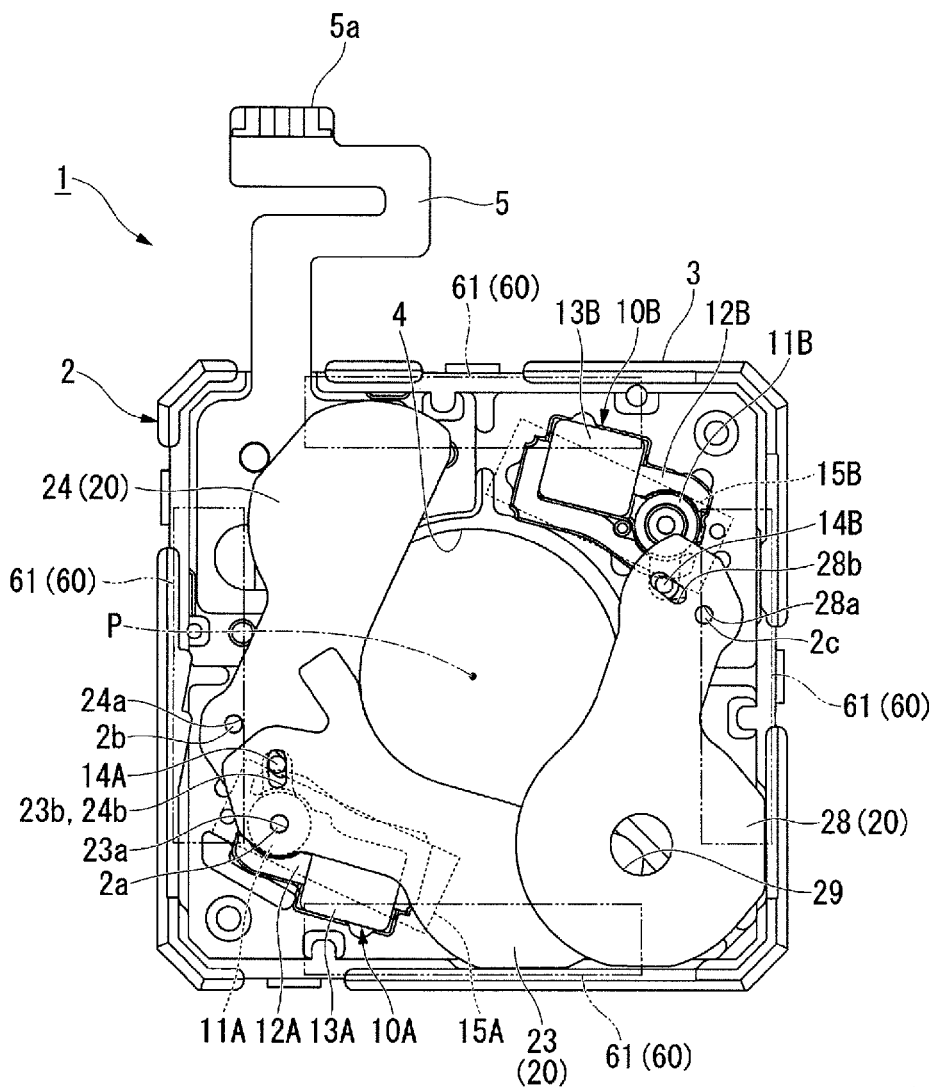
FIG. 4 is an explanatory view of the blade drive device and a plan view showing an internal structure of the blade drive device.

FIG. 4 is an explanatory view for the blade drive device, which is a plan view showing an internal structure of the blade drive device. In FIG. 4, a later-described first middle plate 21, a second middle plate 26 and a cover plate 30 (refer to FIG. 3) are not shown for making the explanation easy to understand. The permanent magnets 61 of the camera module 50 (see FIG. 2) in the state where the blade drive device 1 is attached so as to overlap the camera module 50 are shown by two-dot chain lines in FIG. 4.

As shown in FIG. 4, a first actuator 10A and a second actuator 10B (hereinafter may be referred to as "respective actuators 10A, 10B) are arranged in the lower plate 2. The first actuator 10A includes a rotor 11A having a permanent magnet, a stator 12A in which a magnetic force acts with respect to the rotor 11A by being excited and a coil 13A for exciting the stator 12A. The rotor 11A is rotatably supported by the lower plate 2. The rotor 11A is provided with a drive pin 14A. A later-described first shutter blade 23 and a second shutter blade 24 (hereinafter may be referred to as "respective shutter blades 23, 24") are connected to the drive pin 14A.

The first actuator 10A is arranged at a corner portion of the lower plate 2. The first actuator 10A is arranged in a position corresponding to a gap between a pair of adjacent permanent magnets 61 seen from an axial direction. In more detail, the rotor 11A of the first actuator 10A is arranged in a position corresponding to a gap between a pair of adjacent permanent magnets 61.

The second actuator 10B has the same structure as the first actuator 10A. That is, the second actuator 10B includes a rotor 11B having a permanent magnet, a stator 12B in which a magnetic force acts with respect to the rotor 11B by being excited and a coil 13B for exciting the stator 12B. The rotor 11B is rotatably supported by the lower plate 2. The rotor 11B is provided with a drive pin 14B. A later-described diaphragm blade 28 is connected to the drive pin 14B.

The second actuator 10B is arranged at a corner portion opposite to the corner portion where the first actuator 10A is arranged in the corner portions of the lower plate 2 with the opening 4 of the lower plate 2 interposed therebetween. The second actuator 10B is arranged in a position corresponding to a gap between a pair of adjacent permanent magnets 61 seen from an axial direction. In more detail, the rotor 11B of the first actuator 10B is arranged in a position corresponding to a gap between a pair of adjacent permanent magnets 61.

As shown in FIG. 3, a flexible substrate 5 in which not-shown wiring is formed is attached to the lower plate 2. The flexible substrate 5 is connected to the coil 13A of the first actuator 10A and the coil 13B of the second actuator 10B inside the peripheral wall 3 of the lower plate 2 (not shown). The flexible substrate 5 is also connected to the controller 102 (see FIG. 1) at a terminal portion 5a formed in an outer end portion.

Blades 20 regulating the opening 4, the first middle plate 21, the second middle plate 26 and the cover plate 30 are arranged inside the peripheral wall 3 of the lower plate 2. The regulation of the opening 4 by the blades 20 is to adjust the opening area of the opening 4. The blades 20 includes the above-described respective shutter blades 23, 24 and the above-described diaphragm blade 28. The first middle plate 21, the respective shutter blades 23, 24, the second middle plate 26, the diaphragm blade 28 and the cover plate 30 are stacked in this order.

The first middle plate 21 is formed in a rectangular shape by using, for example, a resin material. The outer shape of the first middle plate 21 approximately corresponds to an inner shape of the peripheral wall 3 of the lower plate 2 seen from the axial direction. An opening 22 is formed around the optical axis P in the center of the first middle plate 21. An inner diameter of the opening 22 is smaller than an inner diameter of the opening 4 of the lower plate 2. Also the first middle plate 21 is formed with through holes 21a, 21b and 21c through which pins 2a, 2b and 2c provided in the lower plate 2 are respectively inserted, a clearance hole 21d for allowing the movement of the drive pin 14A provided in the rotor 11A of the first actuator 10A and a clearance hole 21e for allowing the movement of the drive pin 14B provided in the rotor 11B of the second actuator 10B.

The respective shutter blades 23, 24 are for opening and closing the opening 4 of the lower plate 2. The first shutter blade 23 is formed with a support hole 23a to be engaged with the pin 2a of the lower plate 2 and a cam hole 23b to be engaged with the drive pin 14A of the first actuator 10A. The second shutter blade 24 is formed with a support hole 24a to be engaged with the pin 2b of the plate 2 and a cam hole 24b to be engaged with the drive pin 14A of the first actuator 10A. The respective shutter blades 23, 24 rotate around the pins 2a, 2b respectively at the same time by receiving the drive of the rotor 11A of the first actuator 10A, making transition between states of opening and closing the opening 4 of the lower plate 2. Rotating positions of the respective shutter blades 23, 24 are regulated by being abutted on the lower plate 2 when the opening 4 of the lower plate 2 is opened and closed. In the following description, a position of the rotor 11A in a state where the respective shutter blades 23, 24 open the opening 4 of the lower plate 2 is referred to as an opened position and a position of the rotor 11A in a state where the respective shutter blades 23, 24 close the opening 4 of the lower plate 2 is referred to as a closed position.

The second middle plate 26 is formed in a rectangular shape which is approximately the same as the first middle plate 21 by using, for example, a resin material. The second middle plate 26 is formed with an opening 27 formed around the optical axis P, through holes 26a, 26b and 26c through which pins 2a, 2b and 2c are respectively inserted, a clearance hole 26d for allowing the movement of the drive pin 14A of the first actuator 10A and a clearance hole 26e for allowing the movement of the drive pin 14B of the second actuator 10B. An inner diameter of the opening 27 is approximately the same as the inner diameter of the opening 22 of the first middle plate 21.

The diaphragm blade 28 is for regulating the opening area of the opening 4 of the lower plate 2. A support hole 28a to be engaged with the pin 2c of the lower plate 2 and a cam hole 28b to be engaged with the drive pin 14B of the second actuator 10B are formed in a base end portion of the diaphragm blade 28. A tip end portion of the diaphragm blade 28 is formed in a wide width. The diaphragm blade 28 rotates around the pin 2c by receiving the drive of the rotor 11B of the second actuator 10B, making transition between a state of retreating from the opening 27 of the second middle plate 26 and a state of covering the opening 27 of the second middle plate 26. The rotating position of the diaphragm blade 28 is regulated by being abutted on the lower plate 2 when retreating from the opening 27 of the second middle plate 26 and when covering the opening 27.

The tip end portion of the diaphragm blade 28 is formed so as to overlap the opening 27 completely in the state of covering the opening 27 of the second middle plate 26. Also the tip end portion of the diaphragm blade 28 is formed with a small diaphragm hole 29 formed around the optical axis P in the state of covering the opening 27 of the second middle plate 27. An inner diameter of the small diaphragm hole 29 is smaller than the inter diameter of the opening 27 of the second middle plate 26. The diaphragm blade 28 reduces the light amount passing through the opening 27 by the small diaphragm 29 in the state of covering the opening 27 of the second middle plate 26. In the following description, a position of the rotor 11B in a state where the diaphragm blade 28 retreats from the opening 27 of the second middle plate 26 is referred to as a retreating position and a position of the rotor 11B where the diaphragm blade 28 covers the opening 27 of the second middle plate 26 is referred to as a reduced position.

The cover plate 30 is formed in a rectangular shape which is approximately the same as the first middle plate 21 and the second middle plate 26 seen from the axial direction. The cover plate 30 is formed with an opening 31 formed around the optical axis P, through holes 30a, 30b and 30c through which pins 2a, 2b and 2c are respectively inserted, a clearance hole 30d for allowing the movement of the drive pin 14A of the first actuator 10A and a clearance hole 30e for allowing the movement of the drive pin 14B of the second actuator 10B in the same manner as the first middle plate 21 and the second middle plate 26. An inner diameter of the opening 31 is equivalent to the inner diameter of the opening 22 of the first middle plate 21. Plural hooks 32 to be locked to the lower plate 2 are formed in outer peripheral edges of the cover plate 30. Accordingly, the cover plate 30 covers the inside of the peripheral wall 3 of the lower plate 2 in a state where the first middle plate 21, the respective shutter blades 23, 24, the second middle plate 26 and the diaphragm blade 28 are arranged inside the peripheral wall 3 of the lower plate 2.

Figure 5:
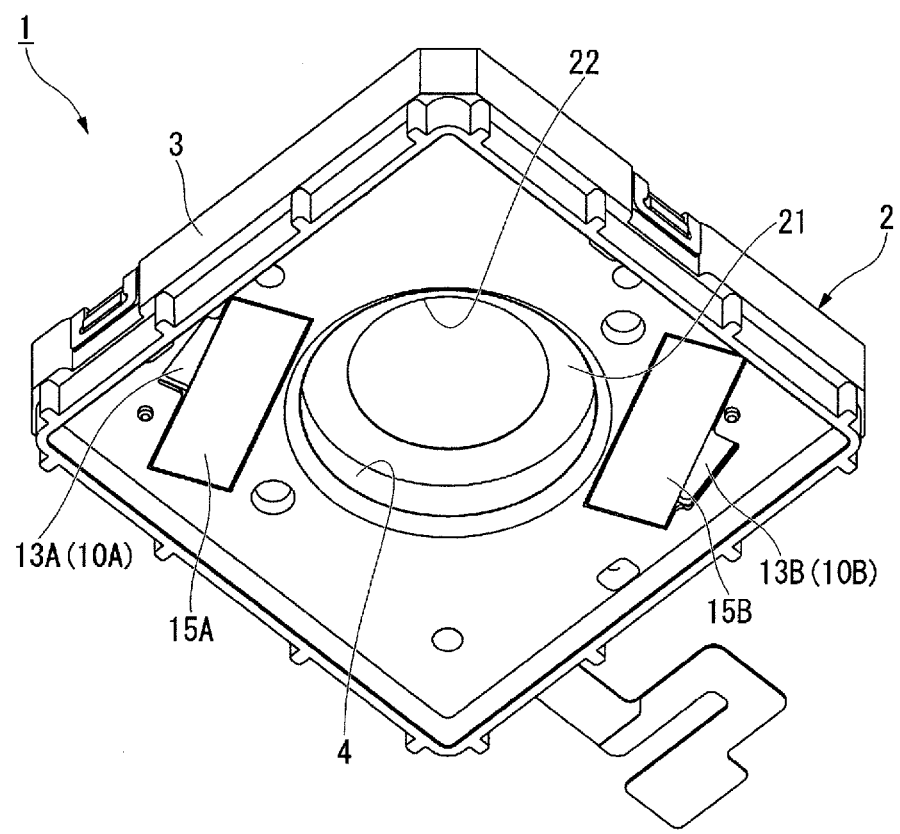
FIG. 5 is a perspective view of the blade drive device.

FIG. 5 is a perspective view of the blade drive device seen from the camera module side.

Here, as shown in FIG. 5, a first shield plate 15A and a second shield plate 15B (hereinafter may be referred to as "respective shield plates 15A, 15B) are arranged on a surface of the lower plate 2 on the camera module 50 side. The respective shield plates 15A, 15B are formed in a rectangular shape by using a magnetic material. It is desirable to use materials having high magnetic permeability as materials for forming the respective shield plates 15A, 15B. For example, SUY (electromagnetic soft iron), SPCC (cold rolled steel sheet), ferritic or martensitic stainless steel with magnetism, SECC (electrogalvanized steel sheet), and silicon steel sheet are preferably used. More preferably, as materials for forming the respective shield plates 15A, 15B, soft magnetic materials such as an iron-nickel soft magnetic material (permalloy) are preferable.

As shown in FIG. 4 and FIG. 5, the first shield plate 15A is arranged in an area between the first actuator 10A and the camera module 50 (see FIG. 2). The first shield plate 15A is buried in a state where one principal surface is exposed in a surface of the lower plate 2 on the camera module 50 side. The first shield plate 15A is arranged so as to cover the rotor 11A seen from the axial direction. In this case, it is desirable that the first shield plate 15A covers ⅔ or more of the area of the first actuator 10A seen from the axial direction.

The second shield plate 15B is arranged in an area between the second actuator 10B and the camera module 50. The second shield plate 15B is buried in a state where one principal surface is exposed in the surface of the lower plate 2 on the camera module 50 side. The second shield plate 15B is arranged so as to cover the rotor 11B seen from the axial direction. In this case, it is desirable that the second shield plate 15B covers ⅔ or more of the area of the second actuator 10B seen from the axial direction.

Hereinafter, the working of the blade drive device 1 according to the embodiment will be explained.

Figure 6:
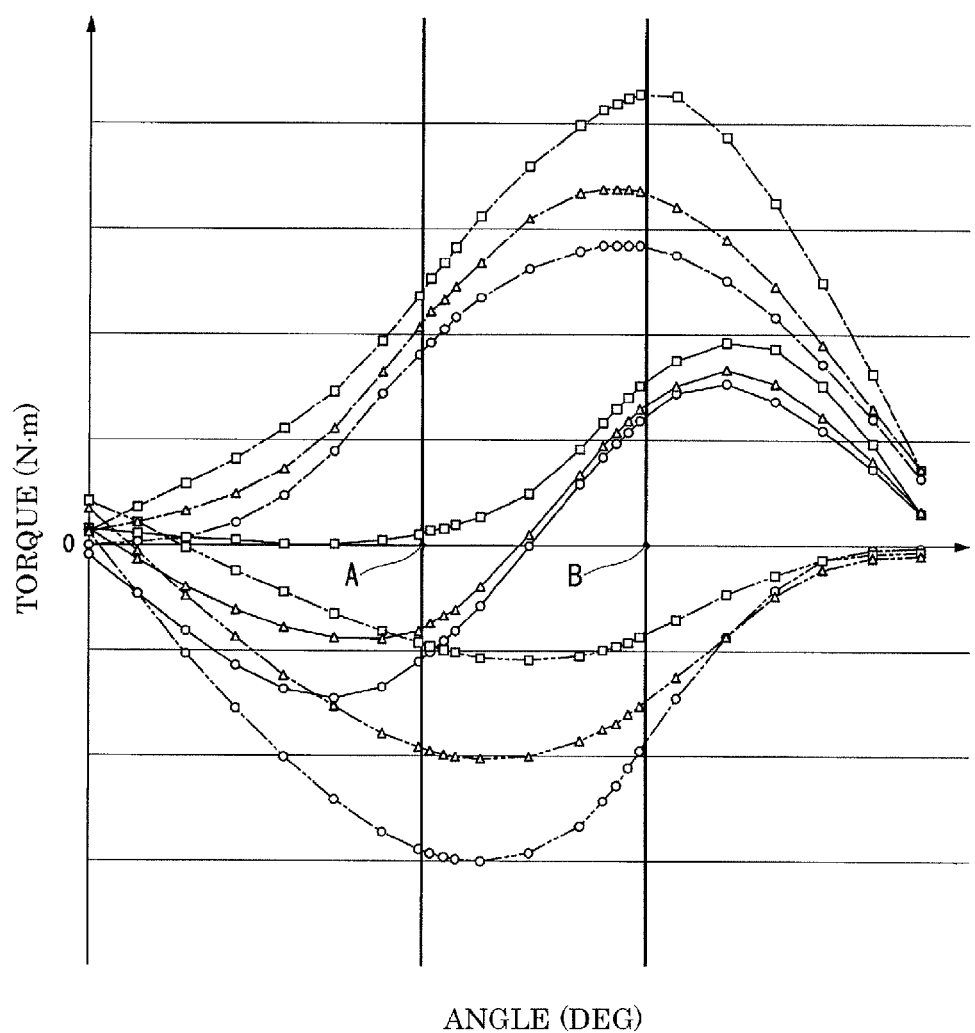
FIG. 6 is a graph showing simulation results of torques acting on rotors of actuators.

FIG. 6 is a graph showing simulation results of torques acting on the rotors of the actuators. A horizontal axis in FIG. 6 represents the rotation angle (°) of the rotors 11A, 11B and a vertical axis represents the torque acting on the rotors 11A, 11B (N·m). Data on solid lines in FIG. 6 indicates data of detent torques (holding torques) acting on the rotors 11A, 11B of the respective actuators 10A, 10B in a non-energized state. Data on one-dot chain lines in FIG. 6 indicates data of energization torques acting on the rotors 11A, 11B obtained when the first actuator 10A moves the rotor 11A from the opened position to the closed position and when the second actuator 10B moves the rotor 11B from the retreating position to the reduced position. Data on two-dot chain lines in FIG. 6 indicates data of energization torques acting on the rotors 11A, 11B obtained when the first actuator 10A moves the rotor 11A from the closed position to the opened position and when the second actuator 10B moves the rotor 11B from the reduced position to the retreating position. Circular dots in FIG. 6 represent data obtained when the blade drive device 1 is used alone in a state where the respective shield plates 15A, 15B are removed. Rectangular dots in FIG. 6 represent data obtained when the blade drive device 1 in a state where the respective shield plates 15A, 15B are removed is attached so as to overlap the camera module 50. Triangular dots in FIG. 6 represent data obtained when the blade drive device 1 including the respective shield plates 15A, 15B is attached so as to overlap the camera module 50.

The operation of the blade drive device 1 will be explained with reference to FIG. 6. Here, the explanation will be made with reference to the data (circular dots in FIG. 6) obtained when the blade drive device 1 is used alone in the state where the respective shield plates 15A, 15B are removed. Concerning symbols of respective components of the blade drive device 1 in the following explanation, see FIG. 2 to FIG. 4.

Rotating ranges of the respective shutter blades 23, 24 and the diaphragm blade 28 are regulated so that the respective actuators 10A, 10B rotate in a range from an angle A to an angle B.

When a prescribed positive electric current (hereinafter referred to as a "positive energization") is applied to the respective actuators 10A, 10B in which the rotors 11A, 11B are positioned in the opened state or the retreating position (the position of the angle A) in the non-energized state, the positive energization torque acts on the rotors 11A, 11B. Then, the rotor 11A moves from the opened position to the closed position (the position of the angle B). The rotor 11B moves from the retreating position to the reduced position (the position of the angle B). When the positive energization with respect to the respective actuators 10A, 10B is cut off in the above state, the positive detent torque acts on the rotors 11A, 11B, therefore, the rotors 11A, 11B are held in the closed position or the reduced position.

When a prescribed negative electric current (hereinafter referred to as a "negative energization") is applied to the respective actuators 10A, 10B in which the rotors 11A, 11B are positioned in the closed state or the reduced position, the negative energization torque acts on the rotors 11A, 11B. Then, the rotor 11A moves from the closed position to the opened position. The rotor 11B moves from the reduced position to the retreating position. When the negative energization with respect to the respective actuators 10A, 10B is cut off in the above state, the negative detent torque acts on the rotors 11A, 11B, therefore, the rotors 11A, 11B are held in the opened position or the reduced position.

Here, in the case where the blade drive device 1 in the state where the respective shield plates 15A, 15B are removed overlaps the camera module 50, the positive detent torque constantly acts on the rotors 11A, 11B in the rotating range due to a leakage flux from the lens drive device 60. Accordingly, the rotor 11A of the first actuator 10A in the non-energized state is held in the closed position in which the detent torque is larger. The rotor 11B of the second actuator 10B in the non-energized state is held in the reduced position where the detect torque is larger. Accordingly, it is difficult for the blade drive device 1 in the state where the respective shield plates 15A, 15B are removed to secure the light amount passing through the opening 4 in the non-energized state.

In response to the above, the detent torque acting on the rotors 11A, 11B becomes close to the detent torque obtained when the blade drive device 1 is used alone by attaching the respective shield plates 15A, 15B to the lower plate 2. That is, the negative detent torque acts on the rotor 11A of the first actuator 10A in the opened position and the positive detent torque acts thereon in the closed position. Accordingly, the first actuator 10A in the non-energized state can hold the rotor 11A in the opened position. The negative detent torque acts on the rotor 11B of the second actuator 10B in the retreating position and the positive detent torque acts thereon in the reduced position. Accordingly, the second actuator 10B in the non-energized state can hold the rotor 11B in the retreating position. Therefore, positions of the respective shutter blades 23, 24 and the diaphragm blade 28 in the non-energized state can be stabilized.

When the blade drive device 1 in the state where the respective shield plates 15A, 15B are removed overlaps the camera module 50, the energization torque in the negative energization acting on the rotors 11A, 11B is reduced in an absolute value by the leakage flux as compared with the case where the blade drive device 1 is used alone. Accordingly, when the blade drive device 1 in the state where the respective shield plates 15A, 15B are removed overlaps the camera module 50, the operation of the respective actuators 10A, 10B in the negative energization becomes unstable due to the shortage of torque.

In response to the above, the energization torque in the negative energization acting on the rotors 11A, 11B becomes close to the energization torque obtained when the blade drive device 1 is used alone by attaching the respective shield plates 15A, 15B to the lower plate 2. Accordingly, the operation of the respective actuators 10A, 10B in the negative energization can be stabilized.

As described above, the blade drive device 1 according to the embodiment includes the lower plate 2 having the opening 4 formed around the optical axis P, the respective shutter blades 23, 24 opening and closing the opening 4, the diaphragm blade 28 regulating the opening area of the opening 4, the first actuator 10A arranged in the lower plate 2 and driving the respective shutter blades 23, 24 and the second actuator 10B driving the diaphragm blade 28. Each of the respective actuators 10A, 10B is arranged at the position corresponding to the gap between a pair of adjacent permanent magnets 61 of the lens drive device 60 seen from the axial direction.

In the camera module 50, plural permanent magnets 61 included in the lens drive device 60 are arranged around the optical axis P in the annular manner so that the same magnetic pole (N-pole) faces the optical axis P. Accordingly, a magnetic field around the camera module 50 is generated so that magnetic lines of force extend along a radiation direction around the optical axis P seen from the axial direction. Accordingly, the position corresponding to the gap between a pair of adjacent permanent magnets 61 seen from the axial direction is an area where a magnetic flux density is locally small as the permanent magnet 61 is not arranged there.

As the respective actuators 10A, 10B are arranged in positions corresponding to the gaps between a pair of adjacent permanent magnets 61 seen from the axial direction in the above structure according to the embodiment, the respective actuators 10A, 10B can be arranged in the areas where the magnetic flux density is small. Therefore, the blade drive device 1 capable of suppressing operation failures due to the leakage flux can be obtained.

The rotors 11A, 11B of the respective actuators 10A, 10B have the permanent magnets. Accordingly, a rotational torque is generated in the rotor 11A, 11B by the magnetic force when the rotors 11A, 11B are arranged in an environment with a large magnetic flux density, therefore, it is difficult for the respective actuators 10A, 10B to accurately drive the rotors 11A, 11B.

As each of the rotors 11A, 11B is arranged in the position corresponding to the gap between a pair of adjacent permanent magnets 61 seen from the axial direction in the blade drive device 1 according to the embodiment, the rotors 11A, 11B can be arranged in areas where the magnetic flux density is small. Accordingly, it is possible to suppress the generation of the rotational torque due to the magnetic force in the rotors 11A, 11B by the leakage flux and to suppress the operation failures due to the leakage flux.

Furthermore, the respective shield plates 15A, 15B formed of a magnetic material are arranged in the area between the respective actuators 10A, 10B and the camera module 50, thereby collecting the magnetic flux around the respective shield plates 15A, 15B and reducing the magnetic flux density around the respective shield plates 15A, 15B. Accordingly, the respective actuators 10A, 10B can be arranged in areas where the magnetic flux density is small. Therefore, the operation failures due to the leakage flux can be suppressed.

Additionally, as the surrounding magnetic flux density is reduced by arranging the respective shield plates 15A, 15B, the sensitivity with respect to the leakage flux due to the arrangement positions of the respective actuators 10A, 10B is reduced, therefore, variation in performance of the blade drive device 1 is reduced. Consequently, mass productivity of the blade drive device 1 can be improved.

The closer the area to permanent magnets 61 of the lens drive device 60 is, the larger the magnetic flux density of the leakage flux is, when seen from the respective actuators 10A, 10B. As the respective shield plates 15A, 15B are arranged in the area between the respective actuators 10A, 10B and the camera module 50 in which the magnetic flux density is large in the embodiment, the magnetic flux density in the areas where the respective actuators 10A, 10B are arranged can be positively reduced. Moreover, as the respective shield plates 15A, 15B are arranged so as to cover the entire rotors 11A, 11B seen from the axial direction, the magnetic flux passing the areas where the respective actuators 10A, 10B are arranged can be reduced. Accordingly, the blade drive device 1 can positively reduce the magnetic flux density in the areas where the rotors 11A, 11B are arranged.

The respective shield plates 15A, 15B are formed of, for example, soft magnetic materials such as permalloy having high magnetic permeability, thereby collecting the magnetic flux around the respective shield plates 15A, 15B and reducing the magnetic flux density around the respective shield plates 15A, 15B. Therefore, it is possible to further suppress the operation failures due to the leakage flux.

As the optical apparatus 101 according to the embodiment includes the blade drive device 1, the operation failures due to the magnetic flux can be suppressed.

The present invention is not limited to the above embodiment explained with reference to the drawings, and various modification examples may be considered within a technical range thereof.

For example, the respective shield plates 15A, 15B are arranged in the area between the respective actuators 10A, 10B and the camera module 50 in the above embodiment, however, the present invention is not limited to this. The respective shield plates may be arranged in an area in the opposite side of the camera module 50 with the respective actuators 10A, 10B interposed therebetween in the axial direction by, for example, being adhered to the cover plate 30 or the like. Even in this case, the respective shield plates can collect the surrounding magnetic flux and can reduce the surrounding magnetic flux density. Accordingly, the respective actuators 10A, 10B can arranged in the area in which the magnetic flux density is small.

Furthermore, the components in the above embodiment can be replaced with well-known components within a scope not departing from the gist of the present invention.

What is claimed is:

1. A blade drive device attached to a camera module including a lens and a lens drive device having plural magnets arranged with gaps around an optical axis of the lens in an annular manner so as to overlap the camera module in an axial direction of the optical axis, comprising:
   a lower plate having an opening formed around the optical axis;
   blades regulating the opening; and
   actuators arranged in the lower plate and driving the blades,
   wherein the actuators are arranged in positions corresponding to the gaps seen from the axial direction.

2. The blade drive device according to claim 1,
   wherein rotors of the actuators are arranged in positions corresponding to the gaps seen from the axial direction.

3. The blade drive device according to claim 1,
   wherein shield plates formed of a magnetic material are arranged in at least one of an area between the actuators and the camera module and an area in the opposite side of the camera module with the actuators interposed therebetween in the axial direction.

4. The blade drive device according to claim 3,
   wherein the shield plates are arranged so as to cover the rotors of the actuators seen from the axial direction as well as arranged in the area between the actuators and the camera module.

5. The blade drive device according to claim 3,
   wherein the shield plates are formed of a soft magnetic material.

6. An optical apparatus comprising:
   the blade drive device according to claim 1.

* * * * *